(12) United States Patent
Brubaker

(10) Patent No.: US 11,097,578 B2
(45) Date of Patent: Aug. 24, 2021

(54) TRAILER FRAME WITH CURVED DRAWBARS

(71) Applicant: Lippert Components, Inc., Elkhart, IN (US)

(72) Inventor: Theodore P. Brubaker, Mishawaka, IN (US)

(73) Assignee: Lippert Components, Inc., Elkhart, IN (US)

( * ) Notice: Subject to any disclaimer, the term of this patent is extended or adjusted under 35 U.S.C. 154(b) by 239 days.

(21) Appl. No.: 16/255,004

(22) Filed: Jan. 23, 2019

(65) Prior Publication Data

US 2019/0225035 A1  Jul. 25, 2019

Related U.S. Application Data

(60) Provisional application No. 62/621,158, filed on Jan. 24, 2018.

(51) Int. Cl.
| | | |
|---|---|---|
| *B60D 1/167* | (2006.01) | |
| *B62D 63/08* | (2006.01) | |
| *B62D 27/02* | (2006.01) | |
| *B62D 21/03* | (2006.01) | |
| *B62D 21/20* | (2006.01) | |
| *B62D 27/06* | (2006.01) | |

(52) U.S. Cl.
CPC ............ *B60D 1/167* (2013.01); *B62D 21/03* (2013.01); *B62D 21/20* (2013.01); *B62D 27/02* (2013.01); *B62D 27/065* (2013.01); *B62D 63/08* (2013.01)

(58) Field of Classification Search
CPC ........ B60D 1/167; B62D 21/20; B62D 63/08; B62D 27/02; B62D 27/065; B62D 21/03
USPC .......................................................... 280/495
See application file for complete search history.

(56) References Cited

U.S. PATENT DOCUMENTS

| | | | | |
|---|---|---|---|---|
| 2,703,243 | A | * | 3/1955 | Clark ...................... B60D 1/40 280/477 |
| 3,939,553 | A | | 2/1976 | Feterl |
| 4,095,818 | A | | 6/1978 | Smith |
| 4,196,918 | A | | 4/1980 | Strader |
| 4,371,299 | A | | 2/1983 | Cain et al. |
| 4,500,132 | A | | 2/1985 | Yoder |
| 4,576,398 | A | | 3/1986 | Kinne |
| 5,649,802 | A | | 7/1997 | Babcock |
| 6,382,671 | B1 | | 5/2002 | MacLellan |
| 6,932,388 | B2 | | 8/2005 | Few et al. |
| 7,287,780 | B2 | | 10/2007 | Reese et al. |
| 8,356,839 | B1 | | 1/2013 | Vey |
| 8,491,010 | B2 | | 7/2013 | Garceau |
| 8,985,631 | B2 | | 3/2015 | Garceau |
| 9,409,603 | B2 | | 8/2016 | Garceau |
| 9,663,013 | B2 | | 5/2017 | Chen et al. |
| 9,776,659 | B2 | | 10/2017 | Frick |
| 9,783,238 | B2 | | 10/2017 | Garceau |

(Continued)

*Primary Examiner* — Minnah L Seoh
*Assistant Examiner* — Felicia L. Brittman
(74) *Attorney, Agent, or Firm* — Nixon & Vanderhye P.C.

(57) ABSTRACT

A trailer frame includes an axle-carrying portion and a tongue. The tongue includes first and second curved drawbars, each defining a convex surface. The convex surface of the first drawbar faces the convex surface of the second drawbar. The facing convex surfaces allow for an increased turning radius of a tow vehicle connected thereto by increasing the distance between the rear corners of the tow vehicle and the tongue.

14 Claims, 17 Drawing Sheets

(56) References Cited

U.S. PATENT DOCUMENTS

2006/0181056 A1\*  8/2006  Weekes ................ B60P 3/1033
                                                    280/414.1
2018/0194415 A1\*  7/2018  Pincheon .............. B60P 3/1075

\* cited by examiner

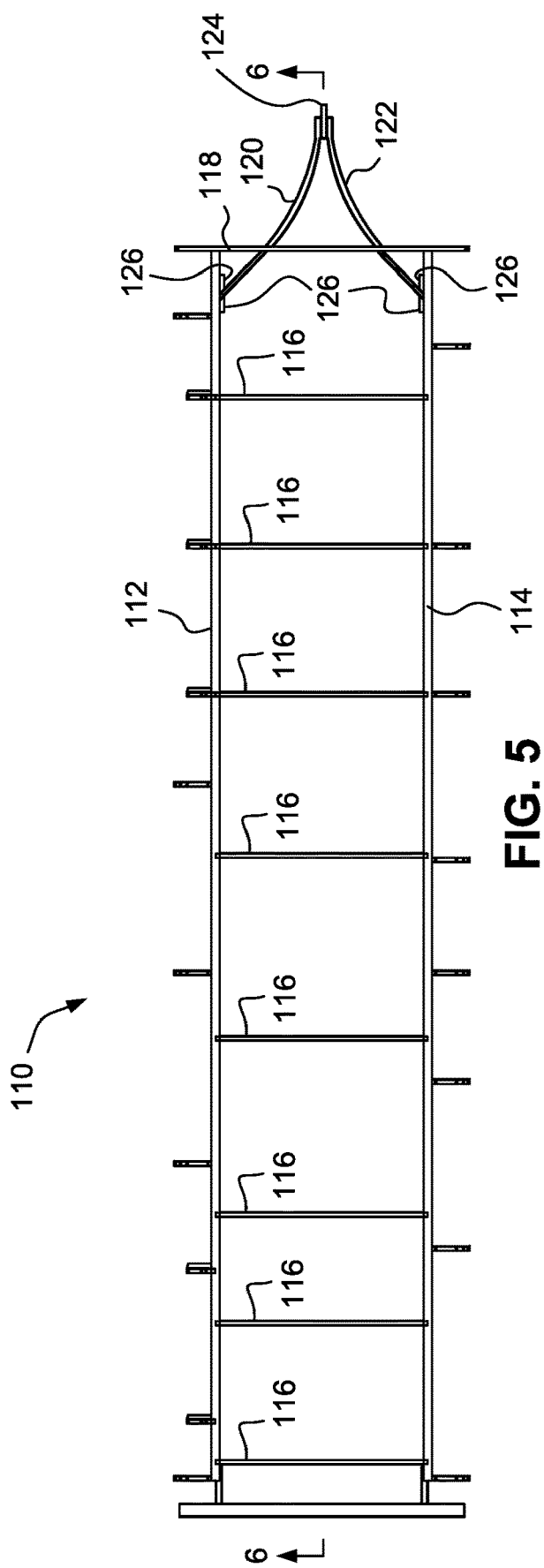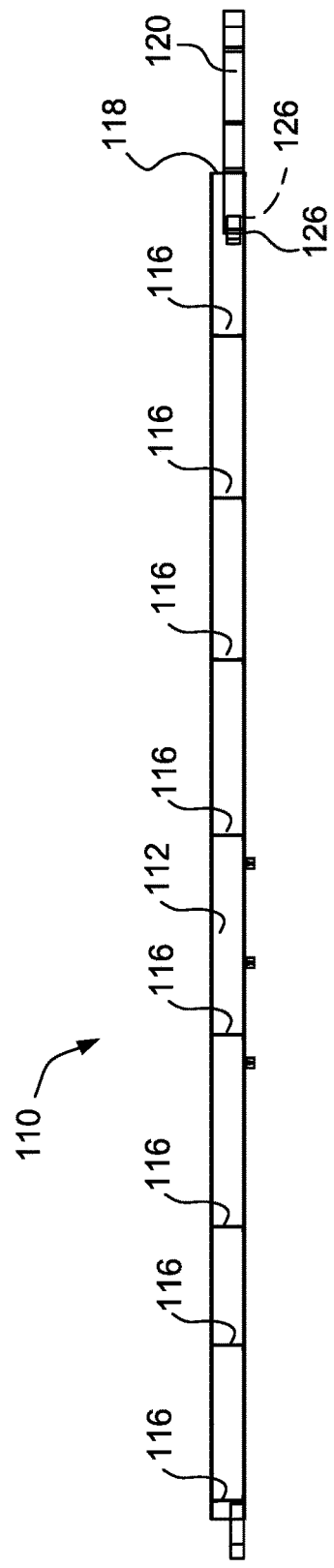
FIG. 5
FIG. 6

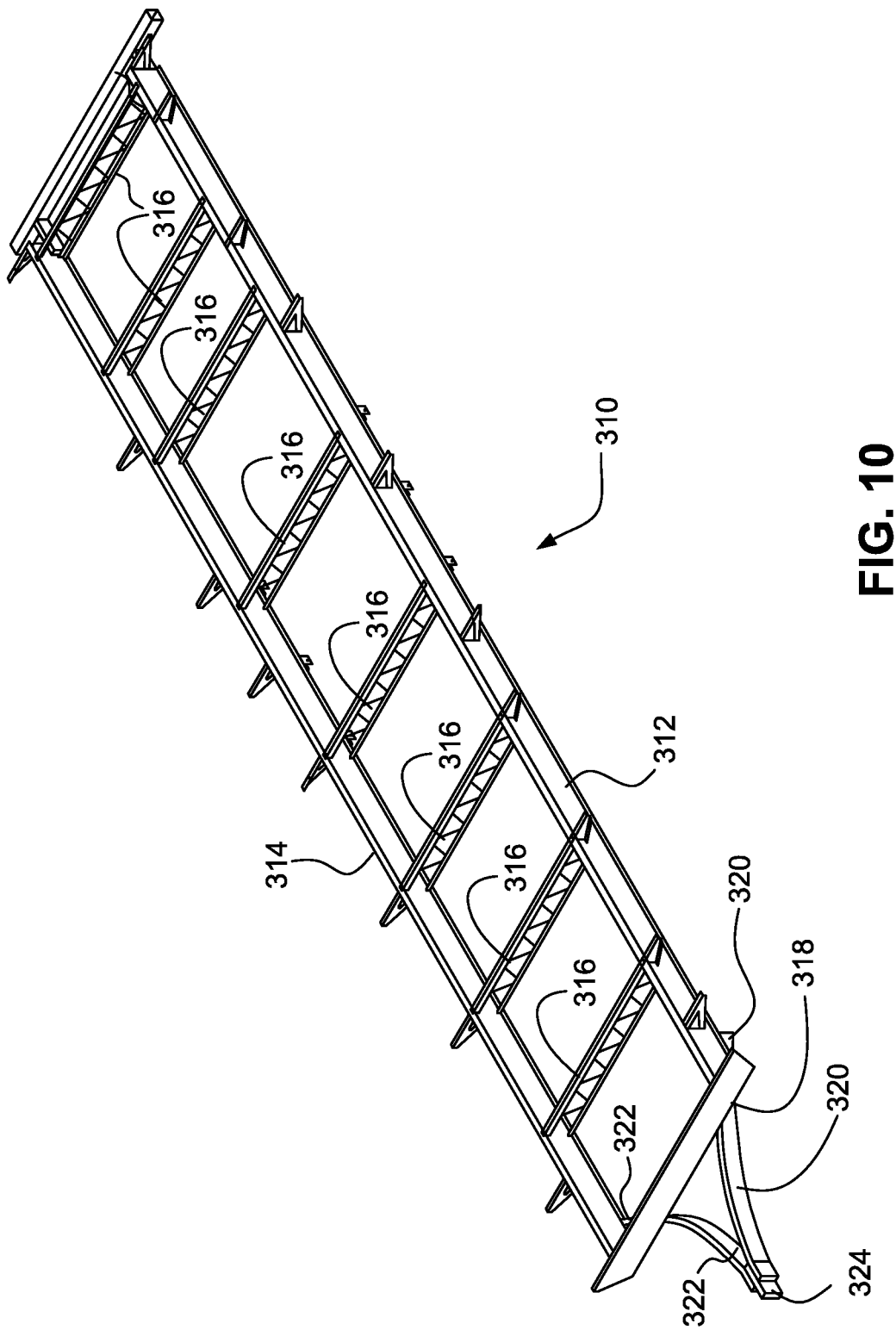

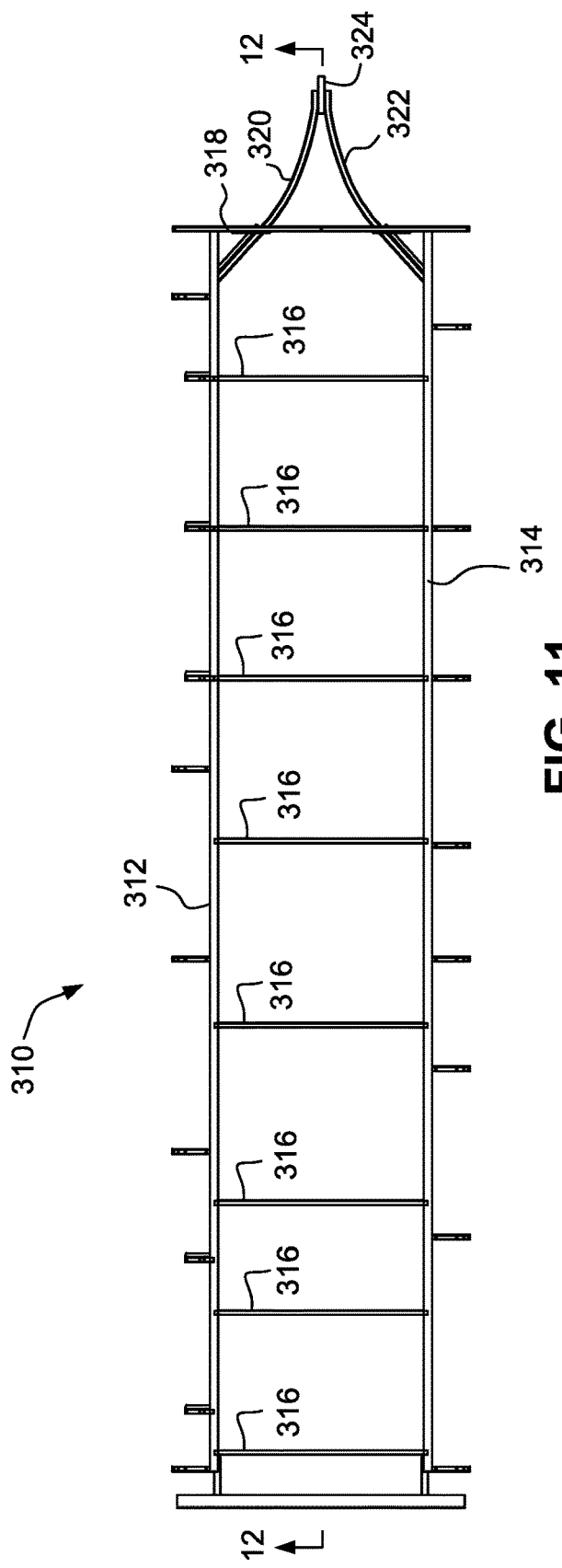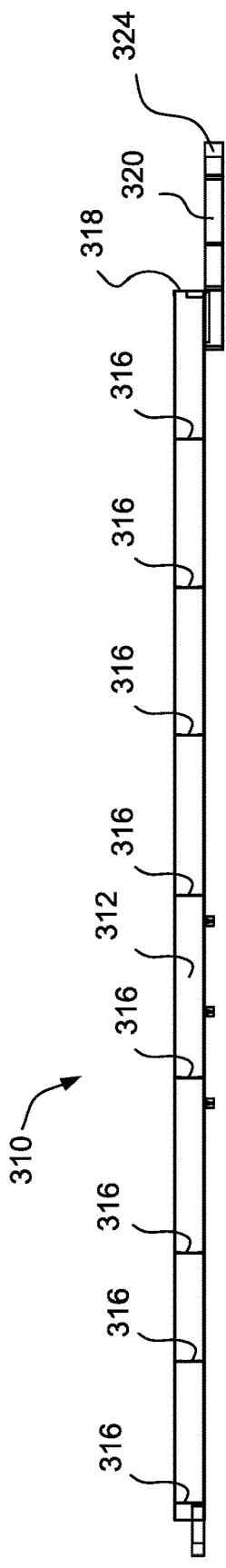

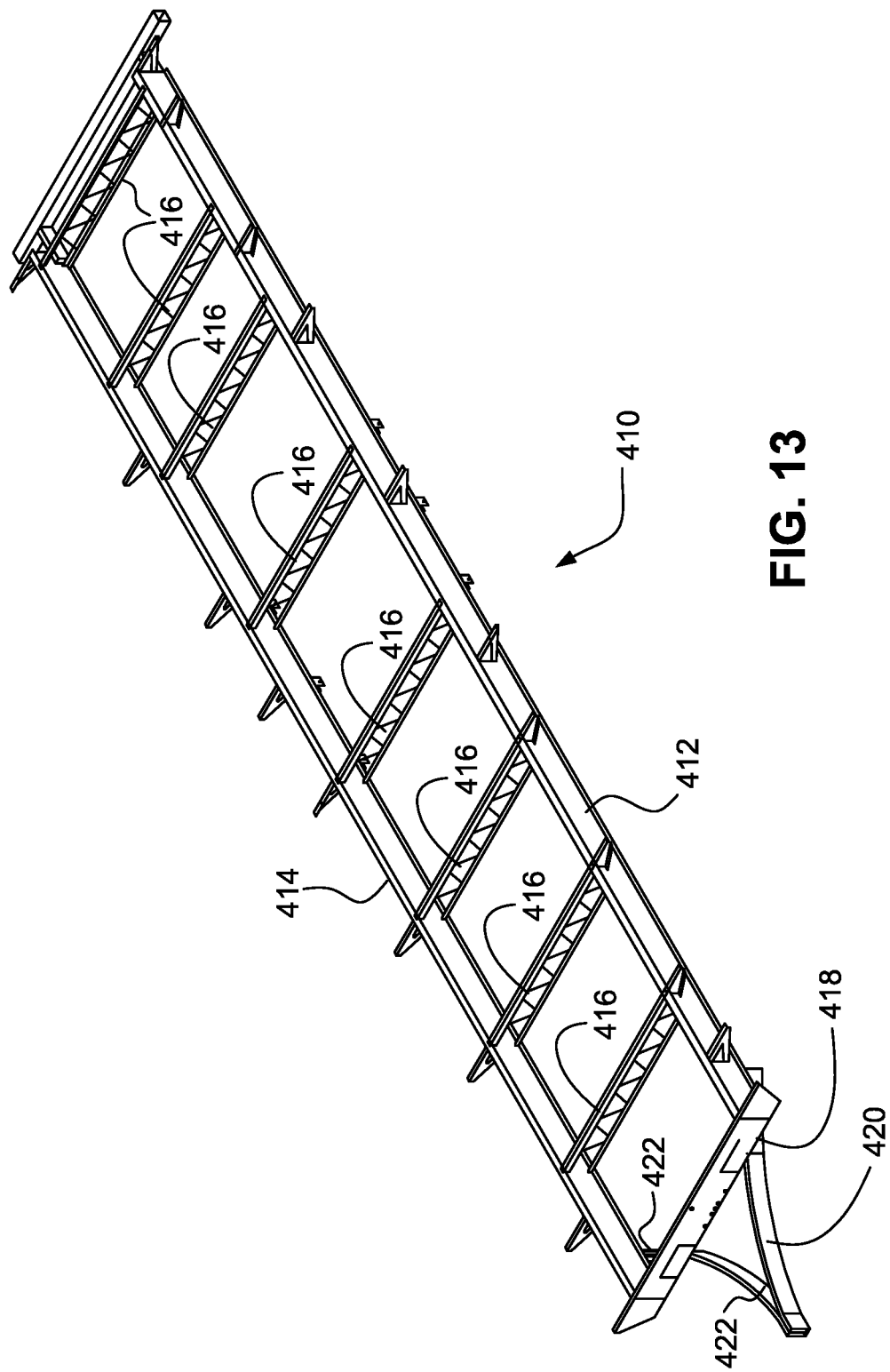

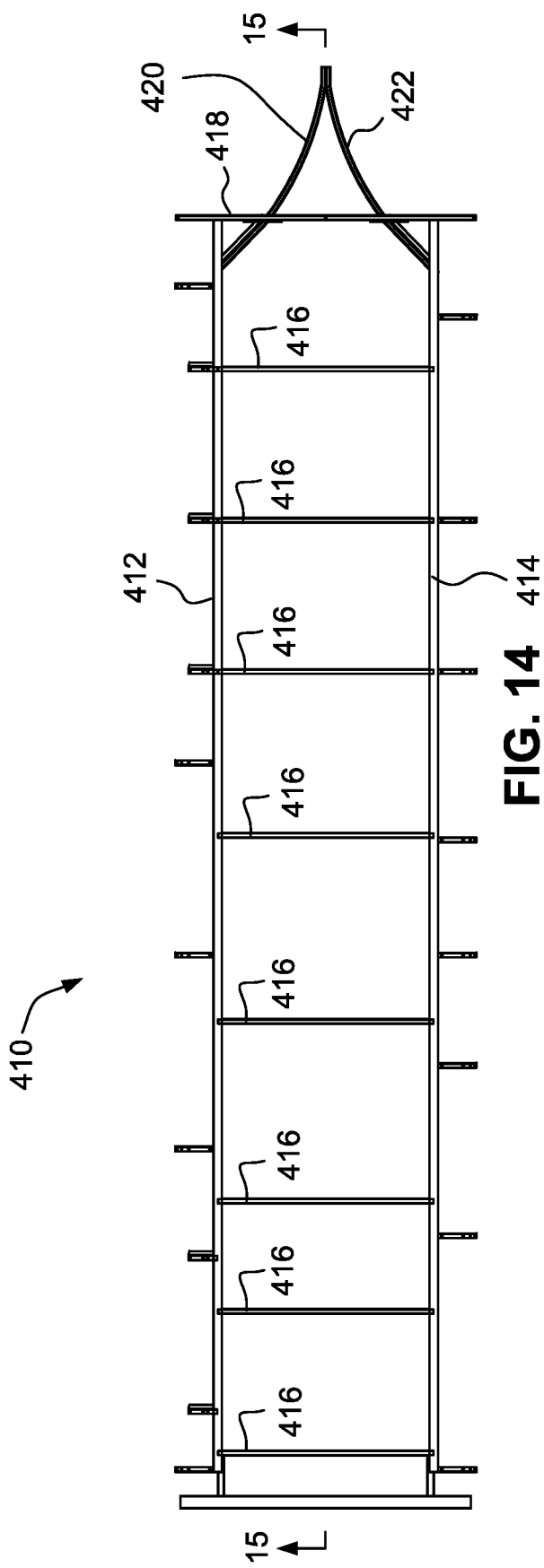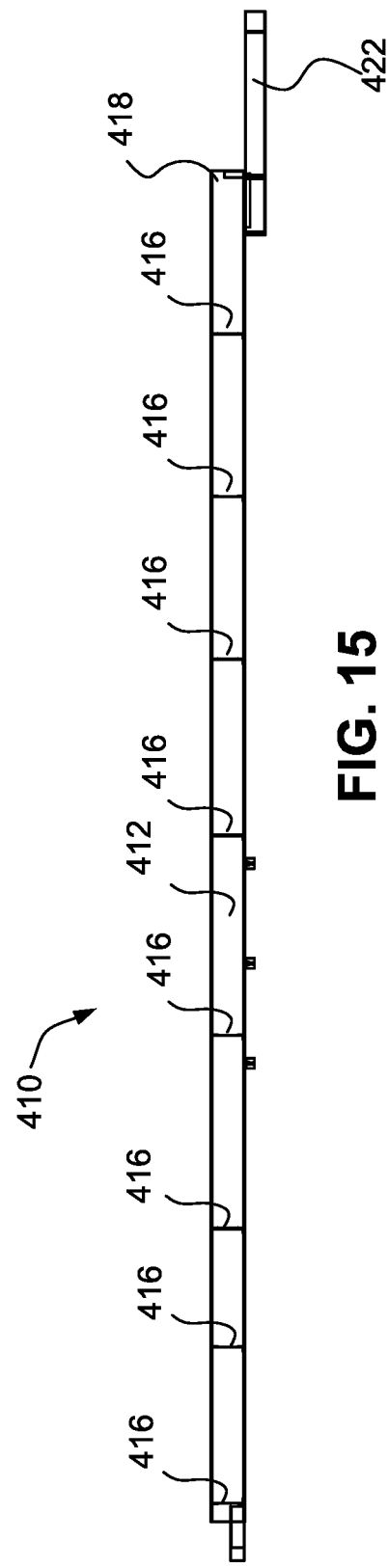

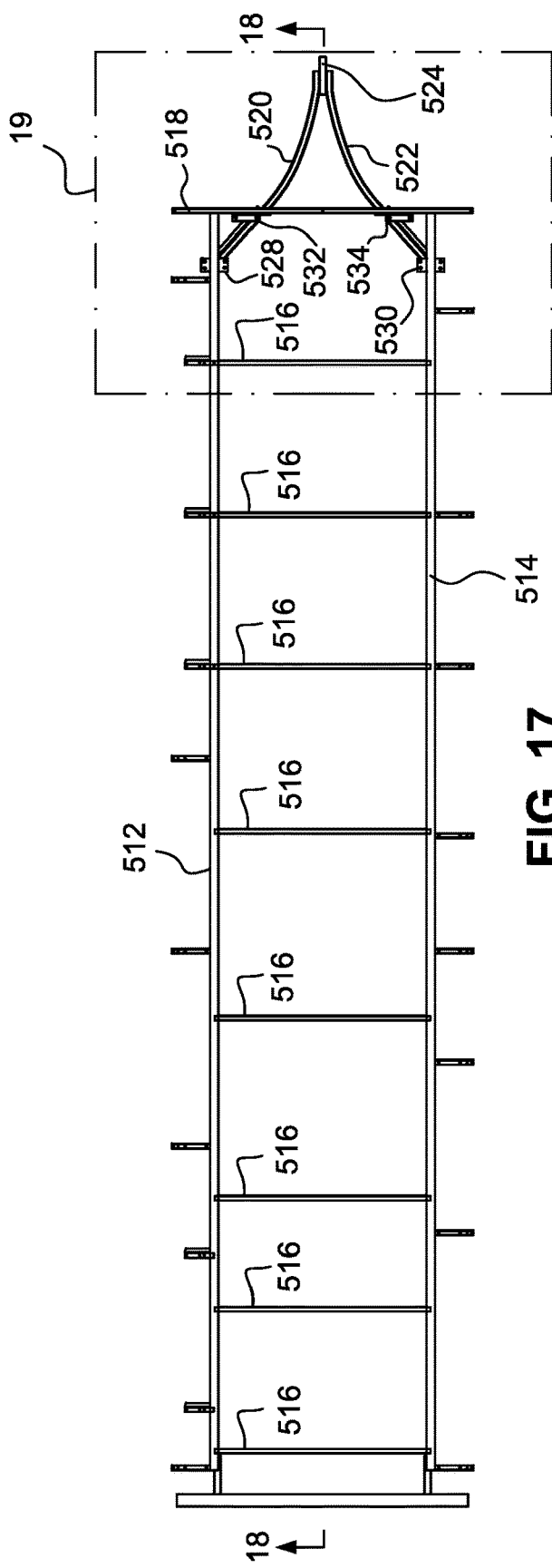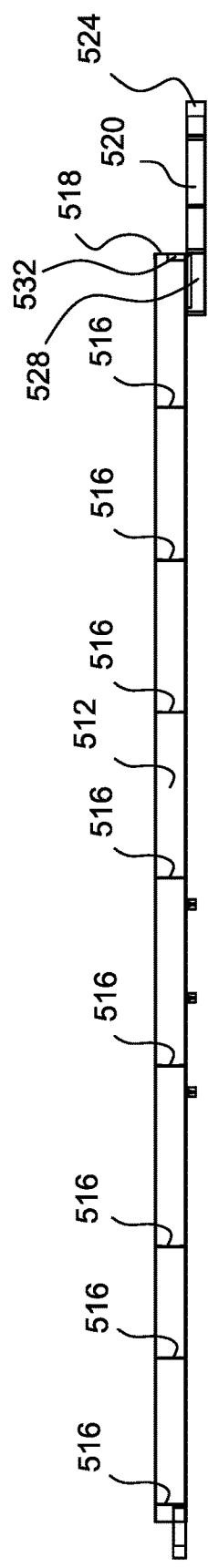
FIG. 17
FIG. 18

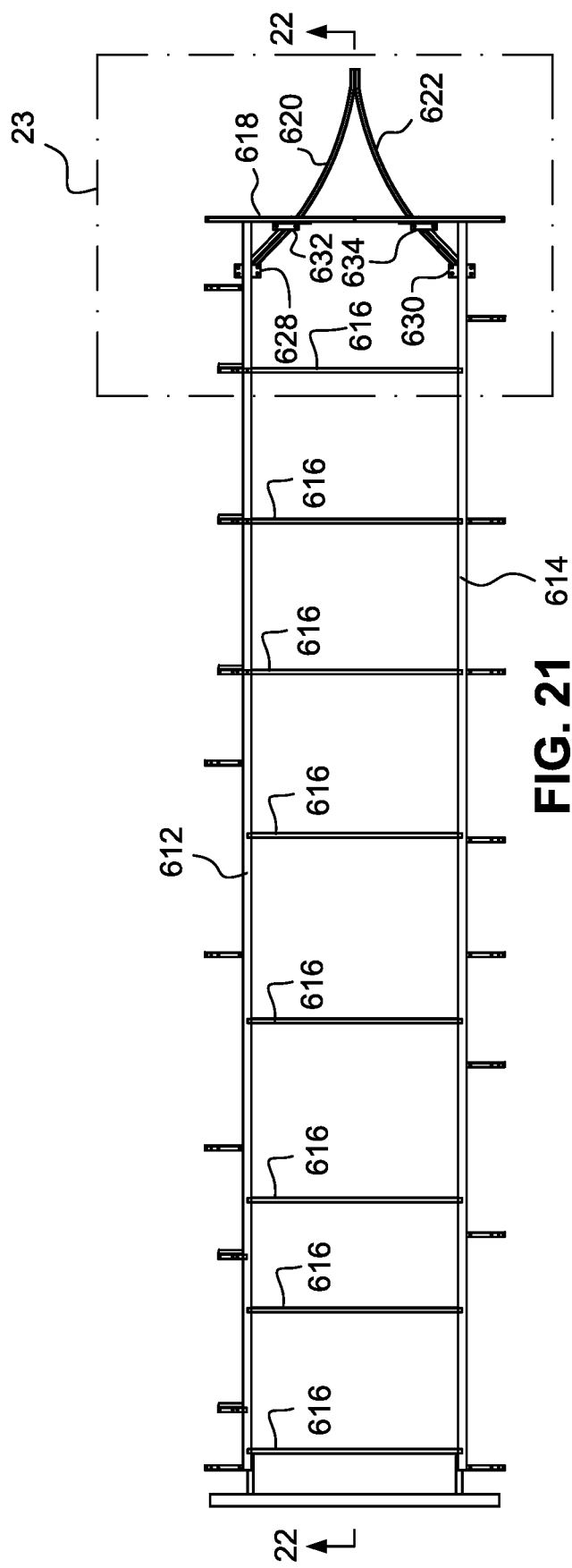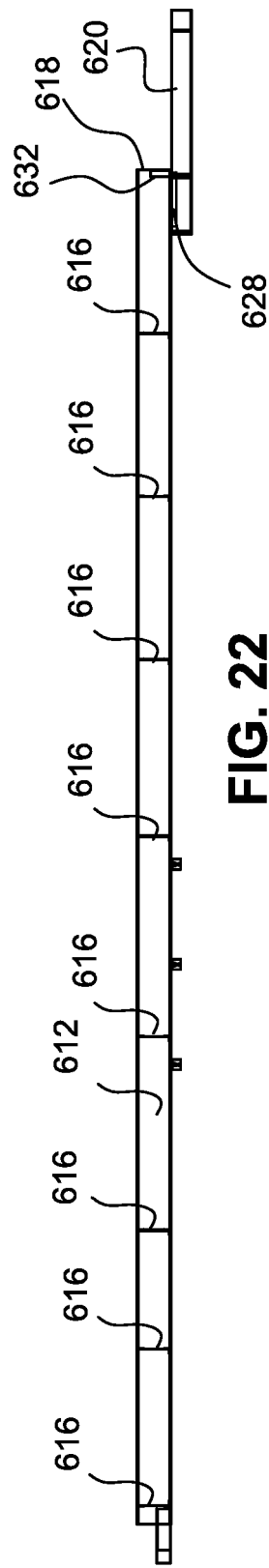

TRAILER FRAME WITH CURVED DRAWBARS

CROSS-REFERENCES TO RELATED APPLICATIONS

This application claims the benefit of U.S. Provisional Patent Application No. 62/621,158, filed Jan. 24, 2018, the entire content of which is herein incorporated by reference.

STATEMENT REGARDING FEDERALLY SPONSORED RESEARCH OR DEVELOPMENT (NOT APPLICABLE)

BACKGROUND

The invention relates to a trailer frame and, more particularly, to a trailer frame with a modified tongue that allows for an increased turning radius of a tow vehicle.

Trailer frames are known in the art. As shown in FIG. 1, a conventional trailer frame includes first and second, generally parallel and spaced apart, longitudinally extending rails 12, 14 connected together by one or more cross members 18. First and second drawbars 20, 22 extend from the forward-most cross member and/or the front ends of the rails 12, 14, thereby defining a tongue of the trailer. The tongue typically is triangular, coming to a point at the forward-most end of the frame. A coupler may be connected to the tongue at that point.

The drawbars defining the tongue typically are straight, extending from left and right sides of the frame and terminating at a point along a centerline of the frame. The turning radius of a tow vehicle to which the trailer may be attached is limited to a radius that permits the rear corners of the tow vehicle to avoid contact with the tongue.

BRIEF SUMMARY

A trailer frame according to the described embodiments may allow for an increased turning radius of a tow vehicle connected thereto by increasing the distance between the rear corners of the tow vehicle and the tongue.

In an exemplary embodiment, the trailer frame includes an axle-carrying section having a forward end, a rearward end, a left side, a right side, and a longitudinal centerline, and a tongue. The tongue includes a first drawbar extending in a forward direction from a first portion of the axle-carrying section distant from the longitudinal centerline to a first location proximate the longitudinal centerline, and a second drawbar extending in a forward direction from a second portion of the axle-carrying section distant from the longitudinal centerline to a second location proximate the longitudinal centerline. Each of the first drawbar and the second drawbar may be curved and defines a respective convex surface, and the convex surface of the first drawbar faces the convex surface of the second drawbar.

Forward ends of the first and second drawbars may be connected directly to each other. Alternatively, the tongue may additionally include an elongated, rectangular tube sandwiched between forward ends of the first and second drawbars. In some embodiments, a portion of the elongated, rectangular tube extends forward of the forward ends of the first and second drawbars.

The axle-carrying section may include a first frame rail defining the left side, a second frame rail defining the right side, and a forward cross member defining the forward end and extending at least between the first frame rail and the second frame rail. In this context, the first and second drawbars may extend through respective openings in the forward cross member. Alternatively, the first and second drawbars may be secured to an underside of the first and second frame rails, respectively, where the first and second drawbars may be secured to an underside of the forward cross member. The first and second drawbars may be bolted or welded to the first and second frame rails, respectively.

In some embodiments, a radius of curvature of the first drawbar is substantially the same as the radius of curvature of the second drawbar.

In another exemplary embodiment, a trailer frame includes a first longitudinal frame rail; a second longitudinal frame rail parallel to and spaced from the first longitudinal frame rail; a plurality of intermediate cross members extending between and connected to the first and second longitudinal frame rails; a forward cross member engaging forward ends of the first longitudinal frame rail and the second longitudinal frame rail; and a tongue including a first curved drawbar connected at one end to the first longitudinal frame rail and a second curved drawbar connected at one end to the second longitudinal frame rail. The first and second curved drawbars extend through or under the forward cross member, and forward ends of the first and second curved drawbars meet at an apex of the tongue.

BRIEF DESCRIPTION OF THE DRAWINGS

These and other aspects and advantages will be described in detail with reference to the accompanying drawings, in which:

FIG. 5 is a top plan view of the trailer frame of FIG. 4;

FIG. 6 is a cross-sectional side elevation view of the trailer frame of FIG. 4;

FIG. 10 is a perspective view of a third embodiment of a trailer frame having curved drawbars;

FIG. 11 is a top plan view of the trailer frame of FIG. 10;

FIG. 12 is a cross-sectional side elevation view of the trailer frame of FIG. 10;

FIG. 13 is a perspective view of a fourth embodiment of a trailer frame having curved drawbars;

FIG. 14 is a top plan view of the trailer frame of FIG. 13;

FIG. 15 is a cross-sectional side elevation view of the trailer frame of FIG. 13;

FIG. 17 is a top plan view of the trailer frame of FIG. 16;

FIG. 18 is a cross-sectional side elevation view of the trailer frame of FIG. 17;

FIG. 21 is a top plan view of the trailer frame of FIG. 20;

FIG. 22 is a cross-sectional side elevation view of the trailer frame of FIG. 20.

DETAILED DESCRIPTION

Terms of orientation, for example, upper, lower, right, left, forward, aft, and the like, as may be used herein refer to relative orientation, and not absolute orientation, unless context clearly dictates otherwise.

Figure 1:
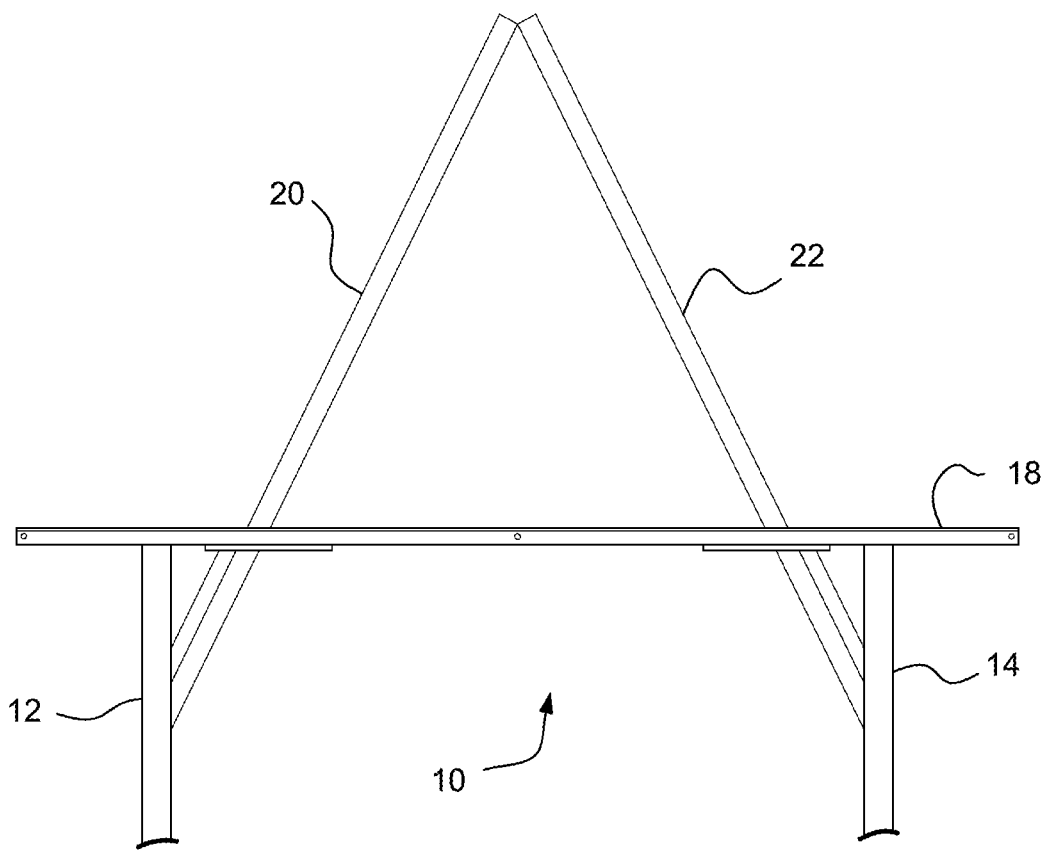
FIG. 1 is a top plan view of a portion of a conventional trailer frame having straight drawbars.
Figure 2:
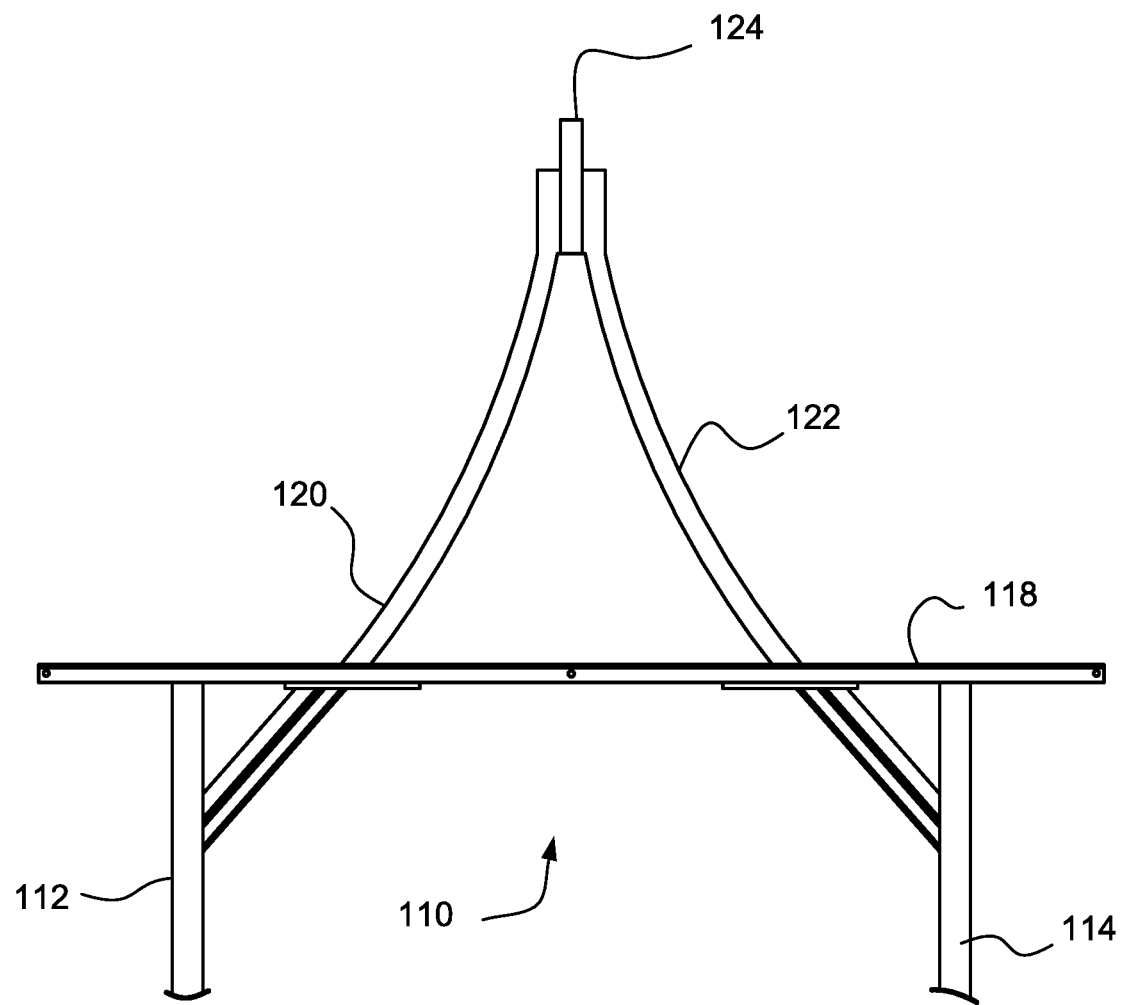
FIG. 2 is a top plan view of a portion of a first embodiment of a trailer frame having curved drawbars.

FIG. 1 shows a conventional trailer frame 10 having first and second longitudinal frame rails 12, 14, a forward cross member 18, and first and second straight drawbars 20, 22 extending through respective openings in the forward cross member 18. Respective first ends of the first and second drawbars 20, 22 are welded to respective interior surfaces of the first and second frame rails 12, 14. Respective second ends of the first and second drawbars 20, 22 are joined to each other at a point at or about a longitudinal centerline of the trailer frame 10.

Figure 3:
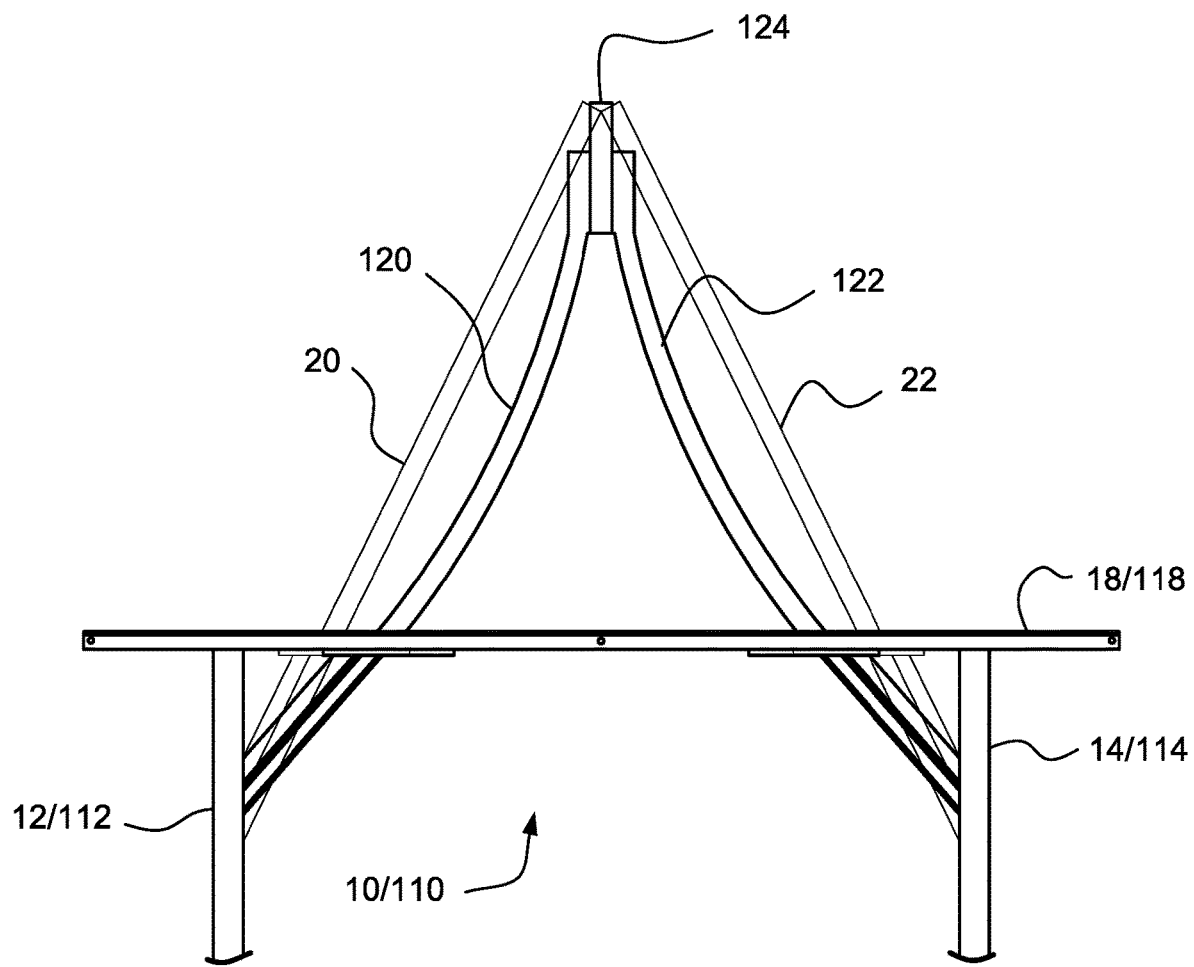
FIG. 3 is an overlay of FIG. 1 onto FIG. 2.

FIGS. 2 and 4-6 show a first illustrative embodiment of a trailer frame 110 having curved drawbars according to the present disclosure, as will be discussed further below. FIG. 3 is an overlay of FIG. 2 onto FIG. 1.

Figure 4:
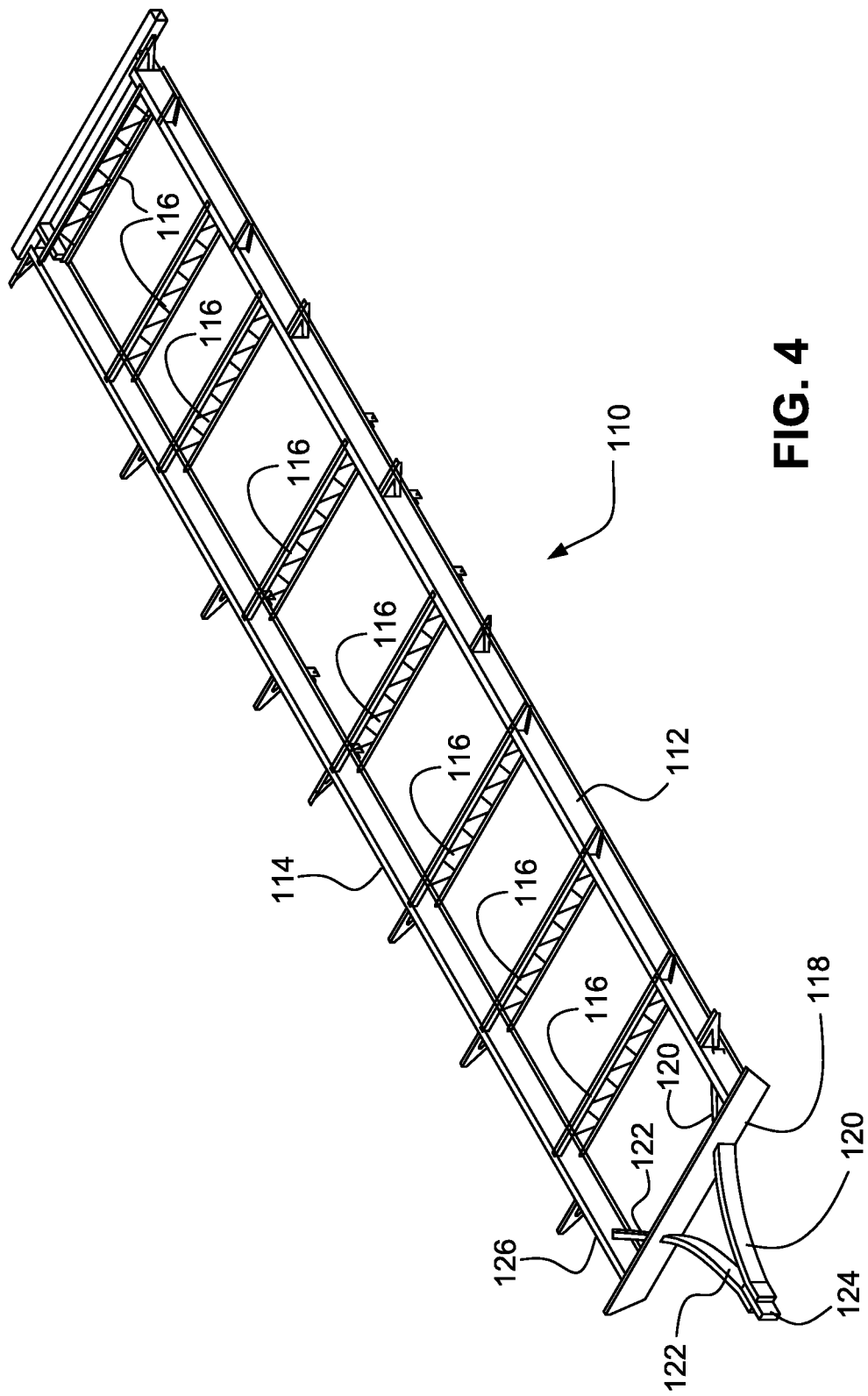
FIG. 4 is a perspective view of the first embodiment of a trailer frame having curved drawbars.

FIGS. 4-6 show the first illustrative embodiment of a trailer frame 110 having curved drawbars according to the present disclosure. The trailer frame 110 includes a first longitudinal frame rail 112 and a second longitudinal frame rail 114 spaced from and generally parallel to the first frame rail 112. Each of the first and second frame rails 112, 114 may by embodied as an I-beam having a web, a first (or upper) flange, and a second (or lower) flange, or another structural shape, for example, a C-shaped or Z-shaped member.

Each of a plurality of intermediate cross members 116 extends between, and is connected at respective first and second ends to, respective surfaces of the first frame rail 112 and the second frame rail 114 at respective intermediate portions thereof. For example, in embodiments where the first frame rail 112 is an I-beam, the first and second ends of the cross members 116 may be connected to any or all of the web, the first flange, and the second flange of the I-beam. The foregoing connections may be, for example, welded connections or bolted connections.

A forward cross member 118 extends between (and may extend beyond) the first frame rail 112 and the second frame rail 114 and is connected to respective forward portions or ends thereof. The foregoing connections may be, for example, welded connections or bolted connections.

The first and second frame rails 112, 114 and the cross members 116, 118 cooperate to define an axle-carrying portion of the trailer frame.

A first curved drawbar 120 extends from an interior surface of the first frame rail 112, that is, a surface of the first frame rail between the first frame rail 112 and the second frame rail 114, through an opening in the forward cross member 118. A first end of the first drawbar 120 is welded to the interior surface of the first frame rail 112. For example, in embodiments where the first frame rail 112 is an I-beam, the first end of the first drawbar 120 may be welded to any or all of the web, the first flange, and the second flange of the I-beam. One or more plates 126 may be provided adjacent the interface of the first rail 112 and the first drawbar 120 for facilitating securement of the first drawbar 120 to the first rail 112. The portion of the first drawbar 120 that passes through the forward cross member 118 may be, but need not be, welded or otherwise secured thereto.

A second curved drawbar 122 extends from an interior surface of the second frame rail 114, that is, a surface of second frame rail 114 between the second frame rail 114 and the first frame rail 112, through an opening in the forward cross member 118. A first end of the second drawbar 122 is welded to the interior surface of the second frame rail 114. For example, in embodiments where the second frame rail 114 is an I-beam, the first end of the second drawbar 122 may be welded to any or all of the web, the first flange, and the second flange of the I-beam. One or more plates 126 may be provided adjacent the interface of the second rail 114 and the second drawbar 122 for facilitating securement of the second drawbar 122 to the second rail 114. The portion of the second drawbar 122 that passes through the forward cross member 118 may be, but need not be, welded or otherwise secured thereto.

Respective second ends of the first and second drawbars 120, 122 are joined together forward of the forward cross member 118 at an apex by a welded or bolted connection or the like. An elongated, rectangular tube 124 having a longitudinal axis is sandwiched between the second ends of the first and second drawbars 120, 122. The longitudinal axis of the tube 124 is generally parallel to the first and second frame rails 112, 114 and may be equidistant therefrom. A portion of the tube 124 extends forward of the second ends of the first and second drawbars 120, 122.

The first and second drawbars 120, 122 and, in some embodiments, the tube 124 cooperate to define a tongue of the trailer. A coupler (not shown) may be connected to the tongue proximate the connection of the first and second drawbars 120, 122 and the tube 124.

Each of the first and second drawbars 120, 122 defines a convex surface. The convex surface of the first drawbar 120 faces the convex surface of the second drawbar 122. The radius of curvature of the first and second drawbars 120, 122 may be selected as desired. Typically, the radius of curvature would deviate significantly from straight, thereby allowing a substantial increase in turning radius of a tow vehicle connected to the trailer.

Typically, though not necessarily, the radius of curvature of the first drawbar 120 would be essentially the same (i.e., within a tolerance) as the radius of curvature of the second drawbar 122. In an embodiment, the radius of curvature of the first and second drawbars 120, 122 could be selected to enable an increase in turning radius of a particular tow vehicle by about six degrees or as much as fifteen degrees or more in both (the left and right) directions. In an embodiment, the radius of curvature of either or both of the first and second drawbars 120, 122 may vary from the first end of the respective drawbar to the other end of the respective drawbar.

Figure 7:
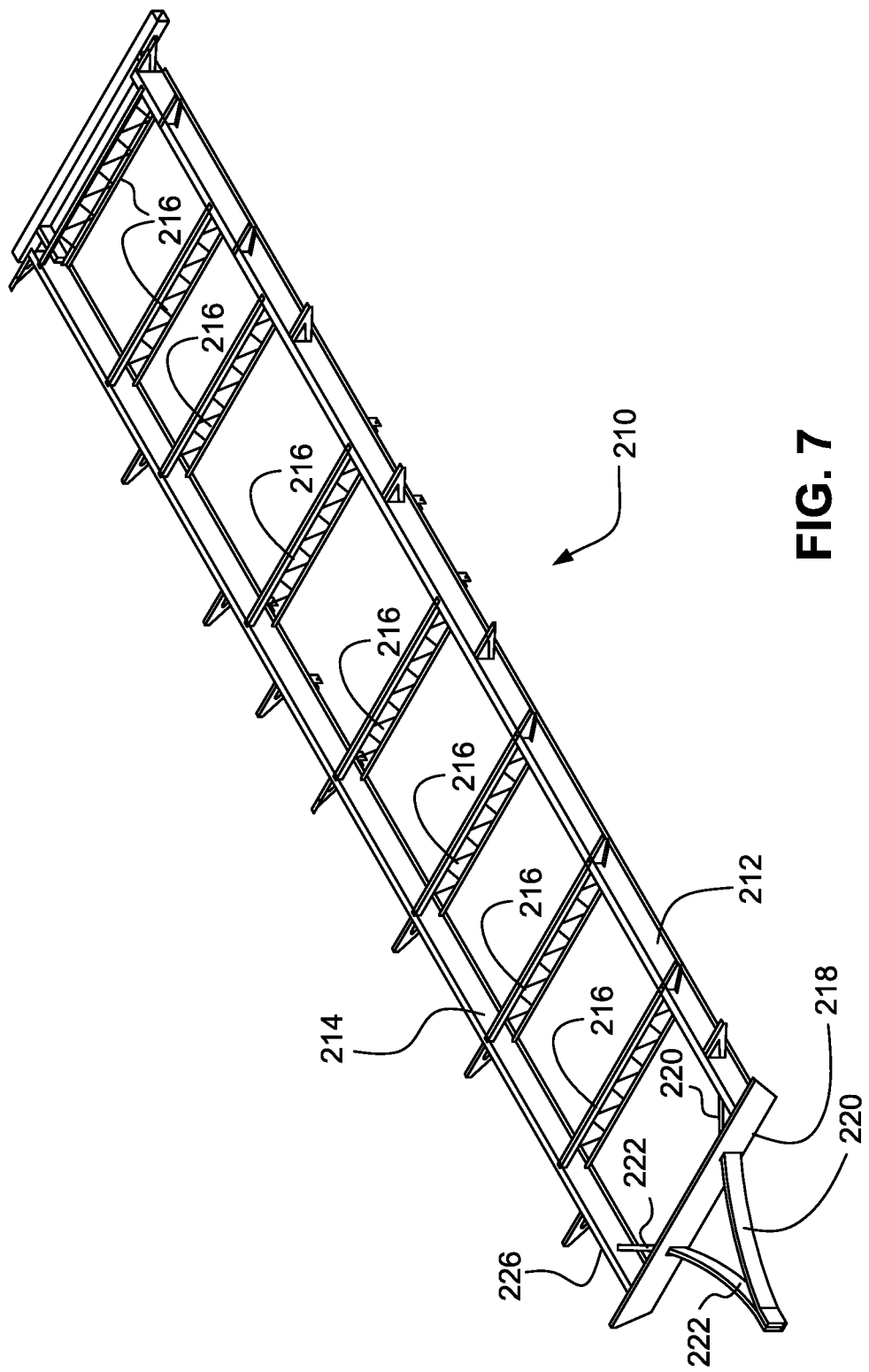
FIG. 7 is a perspective view of a second embodiment of a trailer frame having curved drawbars.
Figure 8:
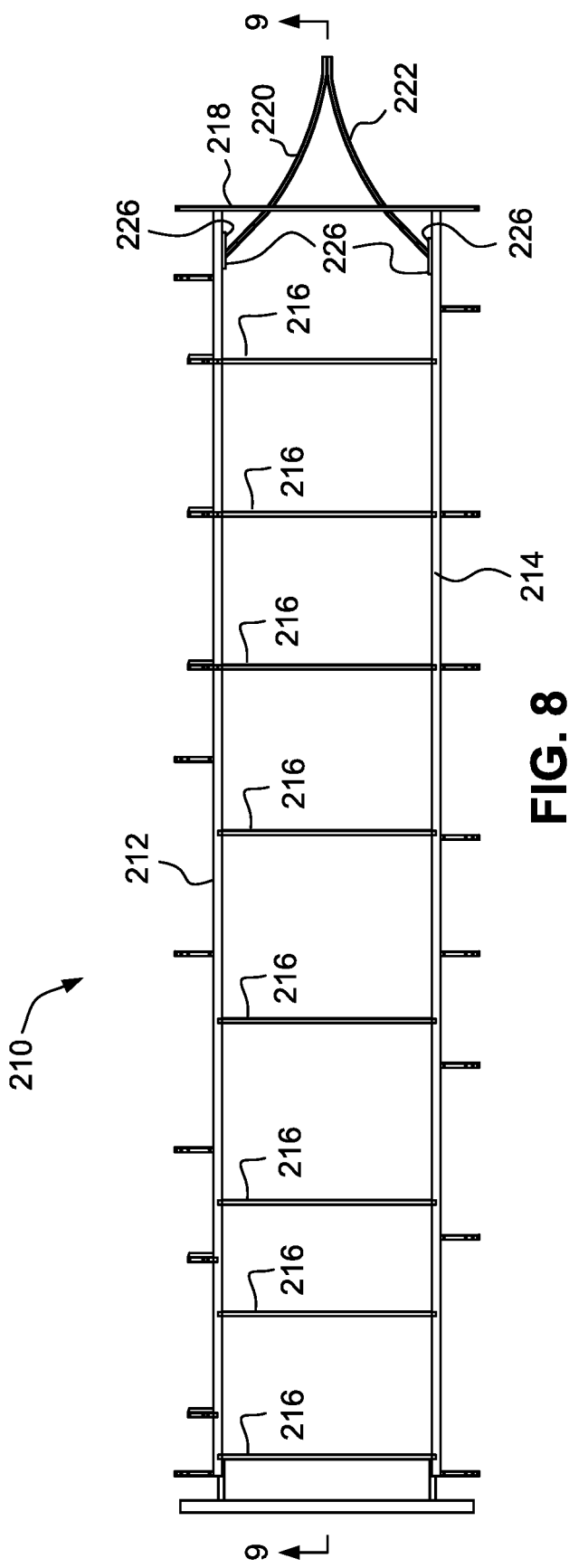
FIG. 8 is a top plan view of the trailer frame of FIG. 7.
Figure 9:
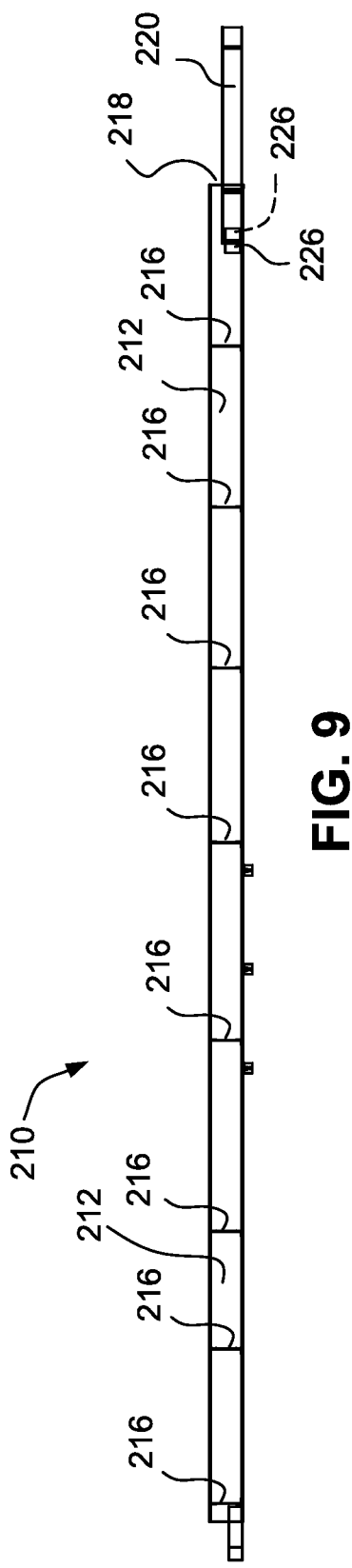
FIG. 9 is a cross-sectional side elevation view of the trailer frame of FIG. 7.
Figure 16:
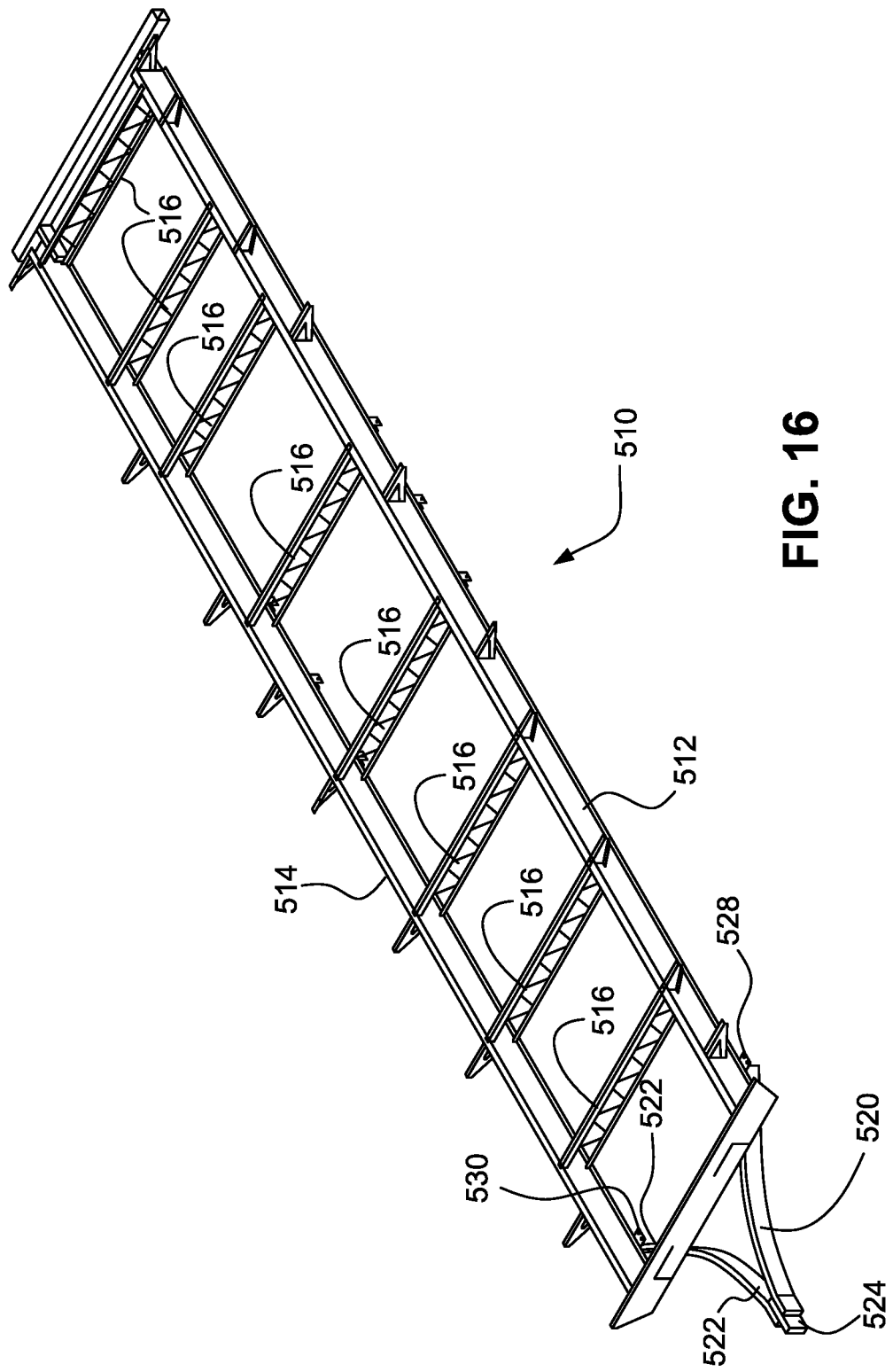
FIG. 16 is a perspective view of a fifth embodiment of a trailer frame having curved drawbars.

FIGS. 7-9 show a second illustrative embodiment of a trailer frame 210 having curved drawbars 220, 222 according to the present disclosure. The trailer frame 210 is similar in most respects to the trailer frame 110 of the first illustrative embodiment, and features of the trailer frame 210 having counterparts in the trailer frame 110 are identified herein by like reference numbers incremented by 100. As such, the trailer frame 210 will not be discussed with the same level of detail as trailer frame 110. Instead, the trailer frame 210 will be discussed in terms of substantial differences between it and the trailer frame 110.

The trailer frame 210 differs from the trailer frame 110 primarily in that the trailer frame 210 lacks a tube corresponding to the tube 124. Instead, the first and second drawbars 220, 222 are connected together at the apex directly or through another intervening component (not shown).

FIGS. 10-12 show a third illustrative embodiment of a trailer frame 310 having curved drawbars 320, 322 according to the present disclosure. The trailer frame 310 is similar in most respects to the trailer frame 110, and features of the trailer frame 310 having counterparts in the trailer frame 110 are identified herein by like reference numbers incremented by 200.

The trailer frame 310 differs from the trailer frame 110 primarily in that the first and second drawbars 320, 322 of the trailer frame 310 are welded to the respective undersides or lower surfaces of the first and second frame rails 312, 314, whereas the first and second drawbars 120, 122 of the trailer frame 110 are welded to respective inner surfaces of the first and second frame rails 112, 114. More specifically, upper portions of the first and second drawbars 320, 322 are welded to the respective undersides or lower surfaces of the first and second frame rails 312, 314, for example, to respective lower flanges of the first and second frame rails 312, 314.

Also, the first and second drawbars 320, 322 extend forward from the respective points of attachment to the first and second frame rails 312, 314 underneath, rather than through, the forward cross member 318. The first and second drawbars 320, 322 may be, but need not be, welded to the underside of the forward cross member 318.

FIGS. 13-15 show a fourth illustrative embodiment of a trailer frame 410 having curved drawbars 420, 422 according to the present disclosure. The trailer frame 410 is similar in most respects to the trailer frame 310, and features of the trailer frame 410 having counterparts in the trailer frame 310 are identified herein by like reference numbers incremented by 100. As such, the trailer frame 410 will not be discussed with the same level of detail as trailer frame 310. Instead, the trailer frame 410 will be discussed in terms of substantial differences between it and the trailer frame 310.

The trailer frame 410 differs from the trailer frame 310 primarily in that the trailer frame 410 lacks a tube corresponding to the tube 324. Instead, the first and second drawbars 420, 422 are connected together directly or through another intervening component (not shown).

FIGS. 16-19 show a fifth illustrative embodiment of a trailer frame 510 having curved drawbars 520, 522 according to the present disclosure. The trailer frame 510 is similar in most respects to the trailer frame 310, and features of the trailer frame 510 having counterparts in the trailer frame 310 are identified herein by like reference numbers incremented by 200. As such, the trailer frame 510 will not be discussed with the same level of detail as trailer frame 310. Instead, the trailer frame 510 will be discussed in terms of substantial differences between it and the trailer frame 310.

The trailer frame 510 differs from the trailer frame 310 primarily in that the first and second drawbars 520, 522 of the trailer frame 510 are bolted to the respective first and second rails 512, 514 thereof, whereas the first and second drawbars 320, 322 of the trailer frame 310 are welded to the respective first and second rails 312, 314 thereof. Also, the first and second drawbars 520, 522 of the trailer frame 510 may be bolted to the forward cross member 518 thereof, whereas the first and second drawbars 320, 322 of the trailer frame 310 may be welded to the forward cross member 318 thereof.

Figure 19:
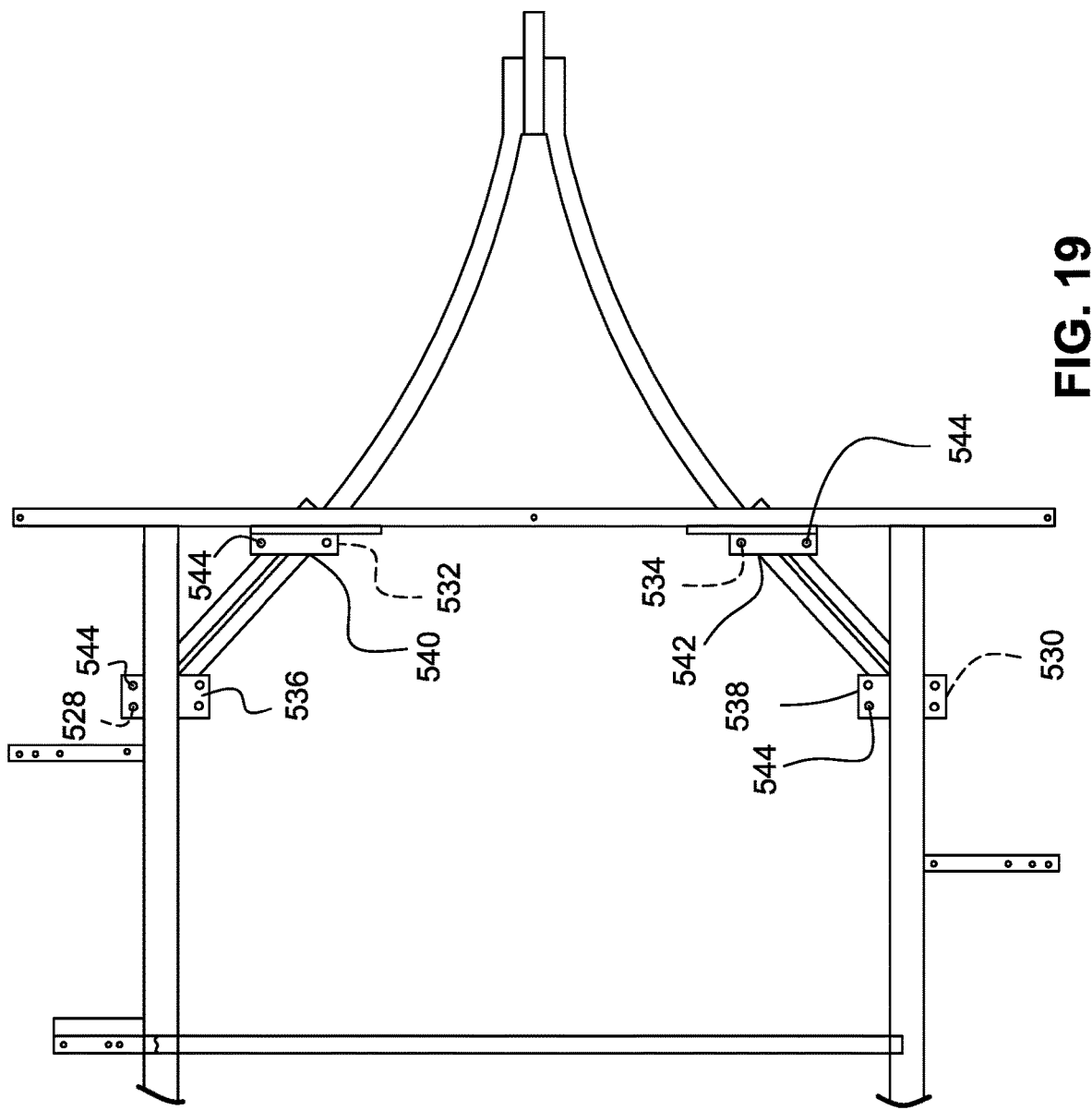
FIG. 19 is a detail top plan view of a portion of the trailer frame of FIG. 17.
Figure 20:
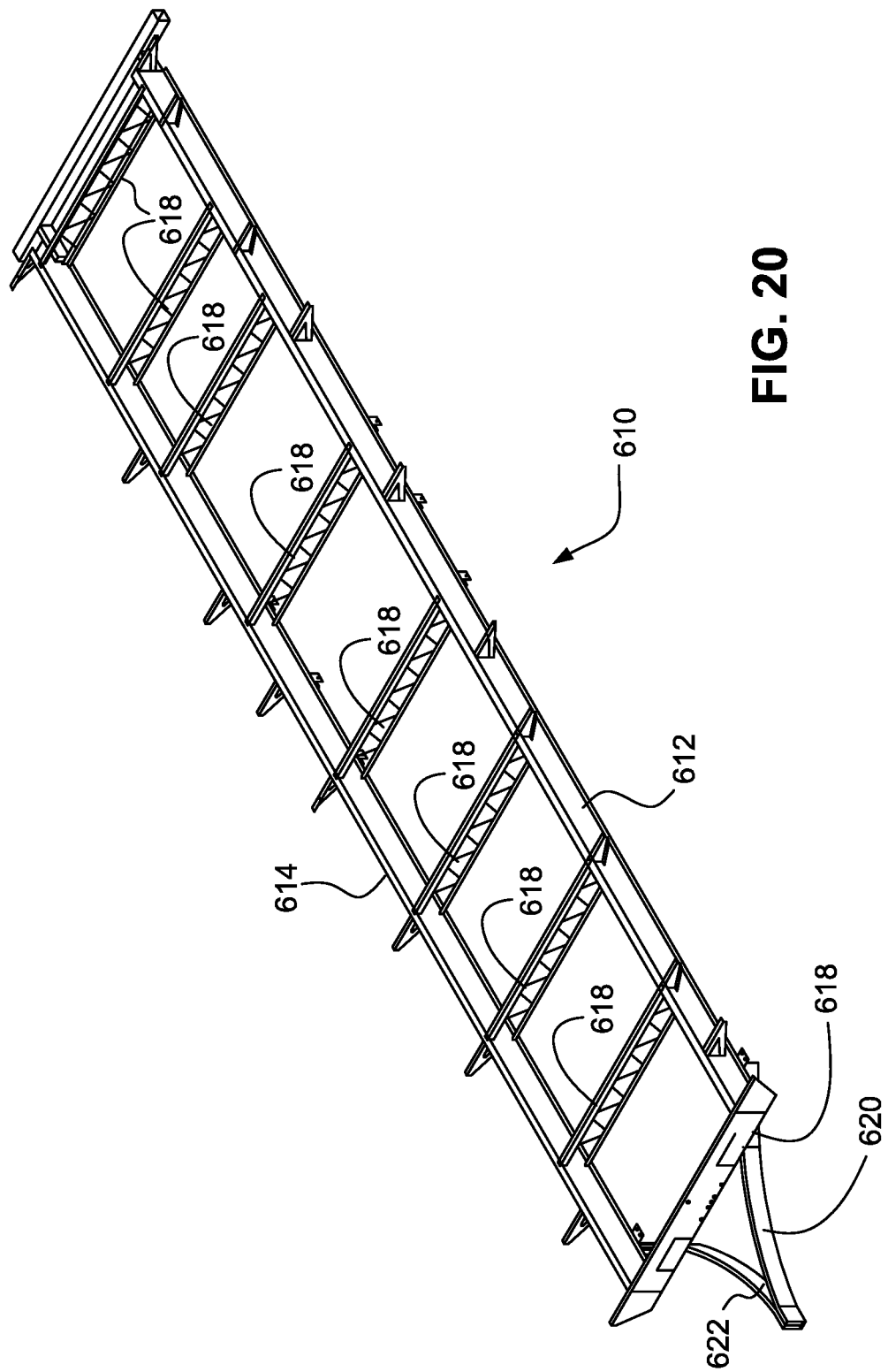
FIG. 20 is a perspective view of a sixth embodiment of a trailer frame having curved drawbars.
Figure 23:
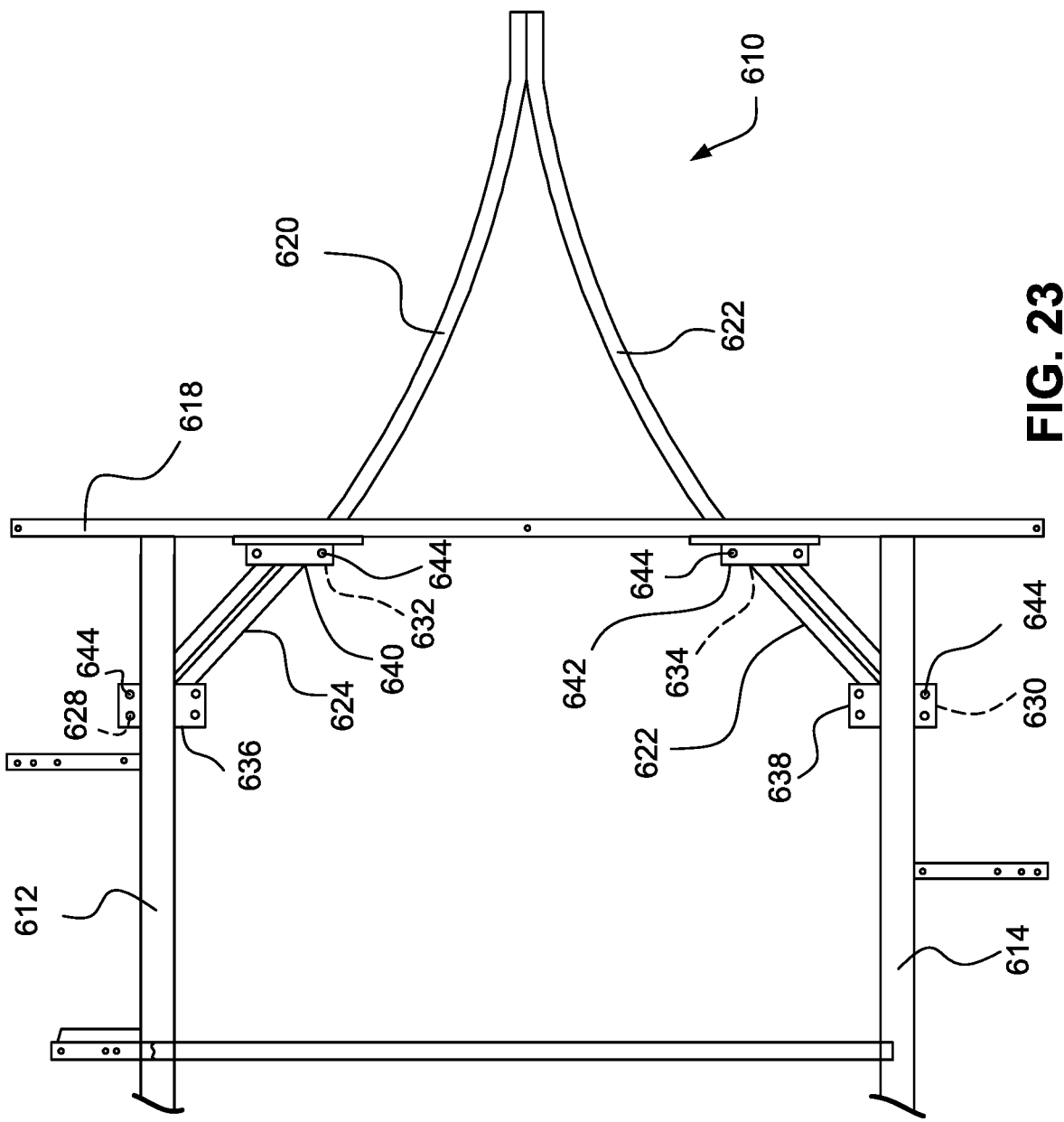
FIG. 23 is a detail top plan view of a portion of the trailer frame of FIG. 20.

FIG. 19 is a detail view showing illustrative bolted connections of the first and second drawbars 520, 522 to the respective first and second rails 512, 514 and to the forward cross member 518. A first connection plate 528 is welded to an upper surface of the first drawbar 520 proximate a first end thereof. A second connection plate 530 is welded to an upper surface of the second drawbar 522 proximate a first end thereof. A third connection plate 532 is welded to an upper surface of the first drawbar 520 proximate its intersection with the forward cross member 518. A fourth connection plate 534 is welded to an upper surface of the second drawbar 522 proximate its intersection with the forward cross member 518. Fifth through eighth connection plates 536, 538, 540, 542 corresponding, respectively, to the first through fourth connection plates 528, 530, 532, 534, are welded to corresponding portions of the first and second rails 512, 514 and the forward cross member 518.

Each of the first through fourth connection plates 528, 530, 532, 534 defines one or more apertures 544 configured to receive a mechanical fastener (not shown). Each of the fifth through eighth connection plates 536, 538, 540, 542 similarly defines one or more apertures 544 configured to receive a mechanical fastener (not shown). The apertures 544 in the first through fourth connection plates 528, 530, 532, 534 are arranged in registration with the apertures 544 in the fifth through eighth connection plates 536, 538, 540, 542 so that a mechanical fastener can be inserted through corresponding pairs of the apertures 544 to secure ones of the first through fourth connection plates 528, 530, 532, 534 to corresponding ones of the fifth through eighth connection plates 536, 538, 540, 542. The mechanical fasteners may be removable (for example, bolts and nuts) or permanent (for example, rivets or huck bolts).

FIGS. 20-23 show a sixth illustrative embodiment of a trailer frame 610 having curved drawbars 620, 622 according to the present disclosure. The trailer frame 610 is similar in most respects to the trailer frame 510, and features of the trailer frame 610 having counterparts in the trailer frame 510 are identified herein by like reference numbers incremented by 100. As such, the trailer frame 610 will not be discussed with the same level of detail as trailer frame 510. Instead, the trailer frame 610 will be discussed in terms of substantial differences between it and the trailer frame 510.

The trailer frame 610 differs from the trailer frame 510 primarily in that the trailer frame 610 lacks a tube corresponding to the tube 524. Instead, the first and second drawbars 620, 622 are connected together directly or through another intervening component (not shown).

Features, options or alternative structures disclosed in connection with any embodiment described herein may be incorporated into any other embodiment described herein to the greatest extent possible. For example, any connection described as welded could instead be bolted, and any connection described as bolted could be welded to the greatest extent possible.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A trailer frame comprising:
   an axle-carrying section having a forward end, a rearward end, a left side, a right side, and a longitudinal centerline; and
   a tongue including a first drawbar extending in a forward direction from a first portion of the axle-carrying section distant from the longitudinal centerline to a first location proximate the longitudinal centerline and a second drawbar extending in a forward direction from a second portion of the axle-carrying section distant from the longitudinal centerline to a second location proximate the longitudinal centerline, wherein each of the first drawbar and the second drawbar is curved and defines a respective convex surface that extends from the first and second portions of the axle-carrying section to the first and second locations, respectively, and wherein the convex surface of the first drawbar faces the convex surface of the second drawbar.

2. A trailer frame according to claim 1, wherein forward ends of the first and second drawbars are connected directly to each other.

3. A trailer frame according to claim 1, wherein the tongue further comprises an elongated, rectangular tube sandwiched between forward ends of the first and second drawbars.

4. A trailer frame according to claim 3, wherein a portion of the elongated, rectangular tube extends forward of the forward ends of the first and second drawbars.

5. A trailer frame according to claim 1, wherein the axle-carrying section comprises a first frame rail defining the left side, a second frame rail defining the right side, and a forward cross member defining the forward end and extending at least between the first frame rail and the second frame rail.

6. A trailer frame according to claim 5, wherein the first and second drawbars extend through respective openings in the forward cross member.

7. A trailer frame according to claim 5, wherein the first and second drawbars are secured to an underside of the first and second frame rails entirely below the first and second frame rails, respectively, and wherein the first and second drawbars are secured to an underside of the forward cross member entirely below the forward cross member.

8. A trailer frame according to claim 5, wherein the first and second drawbars are bolted or welded to the first and second frame rails, respectively.

9. A trailer frame according to claim 1, wherein a radius of curvature of the first drawbar is substantially the same as the radius of curvature of the second drawbar.

10. A trailer frame comprising:
a first longitudinal frame rail;
a second longitudinal frame rail parallel to and spaced from the first longitudinal frame rail;
a plurality of intermediate cross members extending between and connected to the first and second longitudinal frame rails;
a forward cross member engaging forward ends of the first longitudinal frame rail and the second longitudinal frame rail; and
a tongue including a first curved drawbar connected at one end to the first longitudinal frame rail and a second curved drawbar connected at one end to the second longitudinal frame rail, the first and second curved drawbars extending under the forward cross member, wherein forward ends of the first and second curved drawbars meet at an apex of the tongue, and wherein the tongue is disposed in a plane entirely below the forward cross member.

11. A trailer frame according to claim 10, wherein the forward ends of the first and second curved drawbars are connected directly to each other at the apex.

12. A trailer frame according to claim 10, wherein the tongue further comprises an elongated, rectangular tube sandwiched between the forward ends of the first and second curved drawbars at the apex.

13. A trailer frame according to claim 10, wherein each of the first curved drawbar and the second curved drawbar defines a convex surface that respectively extends from the first and second longitudinal frame rails to the apex.

14. A trailer frame according to claim 10, wherein the first and second curved drawbars are fixed to an underside of the forward cross member.

* * * * *